United States Patent
Zimmerman et al.

(10) Patent No.: US 10,048,121 B2
(45) Date of Patent: Aug. 14, 2018

(54) OPTICAL CALIBRATOR, CALIBRATION SYSTEM, AND METHOD

(71) Applicant: RAYTHEON COMPANY, Waltham, MA (US)

(72) Inventors: Andrew J. Zimmerman, Redondo Beach, CA (US); Susan B. Spencer, Rolling Hills Estates, CA (US); Michael L. Menendez, Corona, CA (US)

(73) Assignee: RAYTHEON COMPANY, Waltham, MA (US)

( * ) Notice: Subject to any disclaimer, the term of this patent is extended or adjusted under 35 U.S.C. 154(b) by 11 days.

(21) Appl. No.: 15/252,430

(22) Filed: Aug. 31, 2016

(65) Prior Publication Data

US 2018/0058921 A1    Mar. 1, 2018

(51) Int. Cl.
*G01J 1/04* (2006.01)
*G02B 7/182* (2006.01)

(52) U.S. Cl.
CPC .......... *G01J 1/0414* (2013.01); *G02B 7/1827* (2013.01)

(58) Field of Classification Search
CPC .................................................. G01J 1/0414
See application file for complete search history.

(56) References Cited

U.S. PATENT DOCUMENTS

| 6,547,406 | B1* | 4/2003 | Greenaway | G02B 15/00 348/E5.09 |
|---|---|---|---|---|
| 9,024,253 | B2 | 5/2015 | De Ruyter et al. | |
| 2009/0051910 | A1* | 2/2009 | Imura | G01J 3/0254 356/243.8 |

* cited by examiner

*Primary Examiner* — Hugh H Maupin
(74) *Attorney, Agent, or Firm* — Lando & Anastasi, LLP

(57) ABSTRACT

Calibration devices, systems, and methods for calibrating a sensor. In one example a calibrator includes a housing, a dual-axis mirror positioning mechanism disposed within the housing, and a single calibration mirror coupled to the dual-axis mirror positioning mechanism and disposed within the housing, the dual-axis mirror positioning mechanism being configured to rotate the calibration mirror about a first axis to move the calibration mirror from a stowed position into a deployed position and, when the calibration mirror is in the deployed position, to rotate the calibration mirror about a second axis into a plurality of calibration positions, the first and second axes being orthogonal.

20 Claims, 6 Drawing Sheets

OPTICAL CALIBRATOR, CALIBRATION SYSTEM, AND METHOD

BACKGROUND

Detectors responsive to electromagnetic radiation generally include an array of pixels, each pixel being operable to generate or pass a current in response to electromagnetic energy incident upon the pixel. Typically, the generated or passed current is proportional to the incident energy. The pixels may be prone to some fluctuation in their response behavior over the life of the detector, and there may also be variations from pixel to pixel. An unknown change in performance of the detector could lead to erroneous data regarding measurements of an electromagnetic energy source. Accordingly, although calibration in a laboratory environment is typically performed before deployment, regular re-calibration after deployment may be desired to accommodate for changes in pixel responses over time and ensure uniformity in measurements. Further, for multi-band or multi-spectral detector systems, it can be necessary to provide calibration at different wavelengths (e.g., in different spectral bands), which may require the use of two or more calibration sources. In particular, calibration of multi-band infrared imaging systems may use two or more "black body" calibration sources, each thermally controlled to particular temperature such that it emits a specified and well-controlled spectrum.

Conventional calibrators require multiple mechanisms to configure an imaging system into a calibration mode, in which electromagnetic radiation from a calibration source, rather than from a viewed scene, is directed to the detector, and to select between two or more calibration sources. For example, some calibrators use two mirrors, namely a "switch" mirror to intercept the light path to the detector, and a second "select" mirror to direct the light path to a particular calibration source. Another conventional calibrator design uses a single mirror, but places the calibration sources, each controlled to a particular temperature, on a rotating cradle, such that selection of one of the calibration sources is achieved by rotating the cradle. This arrangement presents difficult thermal challenges. U.S. Pat. No. 9,024, 253 titled "CALIBRATION SYSTEM FOR DETECTOR" discloses another example of a multi-band calibrator that uses a single, one-axis, multi-position calibration mirror that is moved into different positions to select between one of three calibration sources.

SUMMARY OF THE INVENTION

Aspects and embodiments are directed to a calibrator that uses a two-axis mirror mechanism to select one of a plurality of calibration sources.

According to one embodiment a calibrator comprises a housing, a dual-axis mirror positioning mechanism disposed within the housing, and a single calibration mirror coupled to the dual-axis mirror positioning mechanism and disposed within the housing, the dual-axis mirror positioning mechanism being configured to rotate the calibration mirror about a first axis to move the calibration mirror from a stowed position into a deployed position and, when the calibration mirror is in the deployed position, to rotate the calibration mirror about a second axis into a plurality of calibration positions, the first and second axes being orthogonal.

In one example the dual-axis mirror positioning mechanism includes a movable arm configured to rotate about the first axis, the calibration mirror being mounted to the movable arm. The dual-axis mirror positioning mechanism may include a motor and a resolver assembly, for example.

According to another embodiment a calibration system for calibrating a sensor comprises at least one radiation source configured to emit electromagnetic radiation, a dual-axis mirror positioning mechanism disposed opposite the at least one radiation source, and a single calibration mirror coupled to the dual-axis mirror positioning mechanism, the dual-axis mirror positioning mechanism being configured to rotate the calibration mirror about a first axis to move the calibration mirror from a stowed position into a deployed position, and, when the calibration mirror is in the deployed position, to rotate the calibration mirror about a second axis to at least one calibration position, the calibration mirror in the at least one calibration position forming an optical path between the sensor and the at least one radiation source and being configured to receive the electromagnetic radiation from the at least one radiation source and to reflect the electromagnetic radiation toward the sensor, wherein in the stowed position, the calibration mirror does not reflect the electromagnetic radiation from the at least one radiation source.

In one example of the calibration system the first and second axes are orthogonal to one another.

The calibration system may further comprise a housing, the dual-axis mirror positioning mechanism being mounted to the housing and the calibration mirror being contained within the housing. In one example the calibration system further comprises a mounting platform, the at least one radiation source being fixedly mounted to the mounting platform. In one example the mounting platform is integral with the housing. In another example the mounting platform is fixedly connected to the housing.

In one example the at least one radiation source is a black body calibration source configured to emit infrared electromagnetic radiation. In another example the at least one radiation source includes a visible-band calibration source, the visible-band calibration source including an integrating sphere and a visible light source coupled to the integrating sphere. In one example the at least one radiation source includes a plurality of radiation sources, the plurality of radiation sources including a plurality of black body calibration sources each configured to emit infrared electromagnetic radiation. In one example the plurality of black body calibration sources includes three black body calibration sources, and the plurality of calibration positions includes four calibration positions. The plurality of radiation sources may further include a visible-band calibration source, the visible-band calibration source including an integrating sphere mounted to the mounting platform and a visible light source coupled to the integrating sphere. In one example the visible light source includes at least one light emitting diode. In one example, when the calibration mirror is in the deployed position, the dual-axis mirror positioning mechanism is configured to rotate the calibration mirror about the second axis a plurality of calibration positions, the calibration mirror in each of the plurality of calibration positions forming an optical path between the sensor and at least one radiation source of the plurality of radiation sources and being configured to receive the electromagnetic radiation from the at least one radiation source and to reflect the electromagnetic radiation toward the sensor. The calibration system may further comprise a thermal management subsystem coupled to the plurality of black body calibration sources and configured to maintain each black body calibration source within a respective predetermined temperature range.

Another embodiment is directed to a method of calibrating a sensor. The method may comprise rotating a calibration mirror about a first axis from a stowed position to a deployed position, rotating the calibration mirror, when in the deployed position, about a second axis to a first calibration position of a plurality of calibration positions, receiving at the calibration mirror a first radiation beam from a first one of a plurality of radiation sources, the first radiation beam being within a first spectral range, reflecting the first radiation beam from the calibration mirror to the sensor, and performing a first calibration measurement at the sensor using the first radiation beam.

In one example the method further comprises after performing the first calibration measurement, rotating the calibration mirror about the second axis into a second calibration position of the plurality of calibration positions, receiving at the calibration mirror a second radiation beam from a second one of the plurality of radiation sources, the second radiation beam being within a second spectral range different from the first spectral range, reflecting the second radiation beam from the calibration mirror to the sensor, and performing a second calibration measurement at the sensor using the second radiation beam. In one example the first and second spectral ranges are non-overlapping. In another example the method further comprises, after performing the second calibration measurement, rotating the calibration mirror about the first axis to return the calibration mirror to the stowed position.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures.

DETAILED DESCRIPTION

Figure 1:
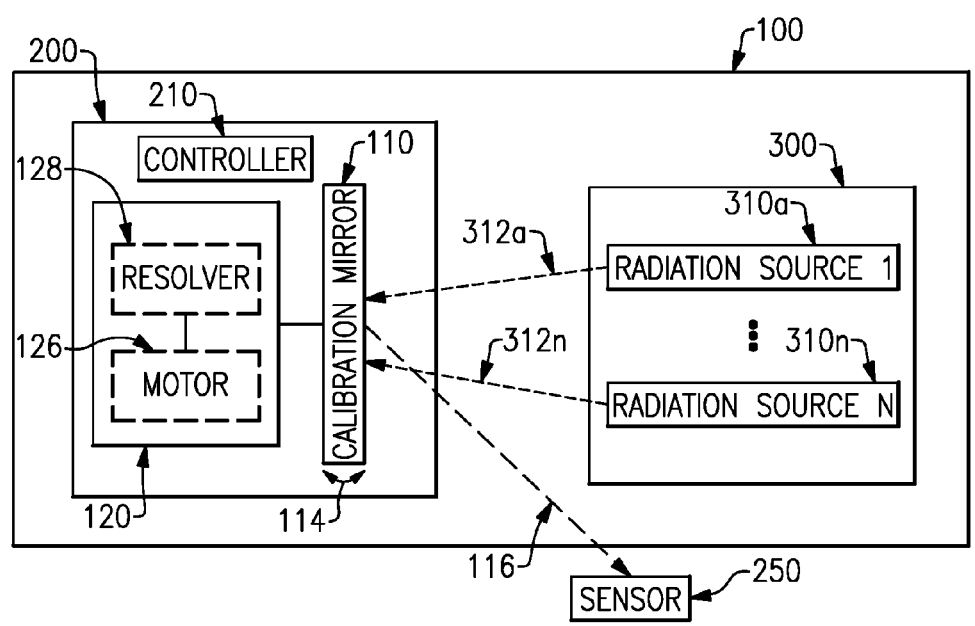
FIG. 1 is a block diagram of a portion of an optical system including an example of the calibration system and a sensor to be calibrated, according to aspects of the present invention.

Aspects and embodiments are directed to a calibrator and calibration system for calibrating a sensor (also called a detector) in an optical system. According to certain embodiments, the calibration system includes a plurality of calibration sources, allowing for calibration at multiple wavelengths or over multiple spectral bands. As discussed above, traditional calibrator designs typically include both a "switch" mirror to configure the optical system into a calibration mode, and a "select" mirror to select between multiple calibration sources. According to certain embodiments there is provided a calibrator design that eliminates the select mirror present in conventional calibrators, and combines the two functions ("switch" and "select") into a single dual-axis mirror mechanism. As discussed in more detail below, in certain examples, a single mirror is deployed from a stowed position into the calibration light path through movement about one axis, and is then rotated about a second axis to select one of the calibration sources. Using only one mirror in the calibration path reduces the overall calibration error compared to multi-mirror designs. As discussed further below, in certain examples, the calibrator can accommodate four mirror positions for four individual calibration sources, such as three black bodies (for calibration in various infrared spectral bands or wavelengths) and one integrating sphere (for calibration in the visible spectral band), for example. The calibration sources can be positioned on a stationary platform (i.e., no rotation or other movement of the source platform is necessary to select between sources or perform the calibration), thereby allowing for more efficient thermal management of the calibration sources. The calibration system disclosed herein may be useful in a wide variety of applications, including space-based applications. For example, such a calibration system may be used for on-board calibration of sensors mounted on a spacecraft.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 2:
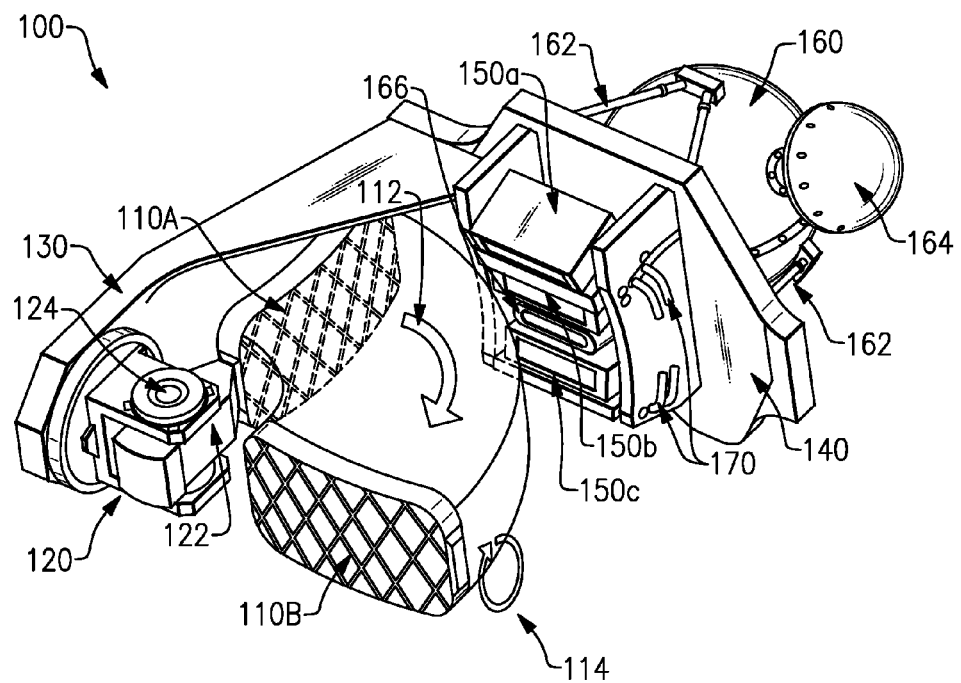
FIG. 2 is a schematic diagram of one example of a calibration system according to aspects of the present invention.
Figure 3:
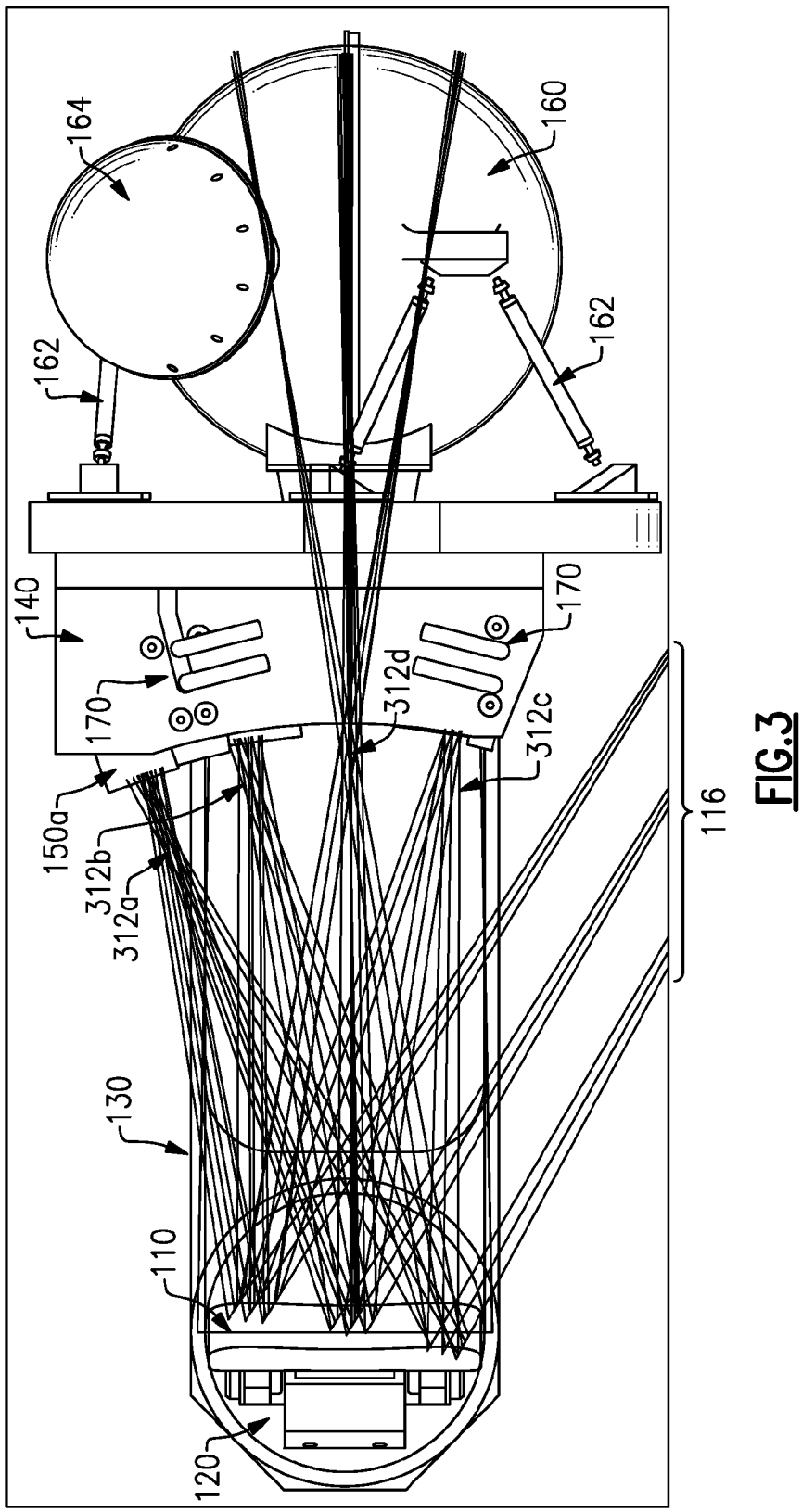
FIG. 3 is a side view of an example of the calibration system of FIG. 2.
Figure 4:
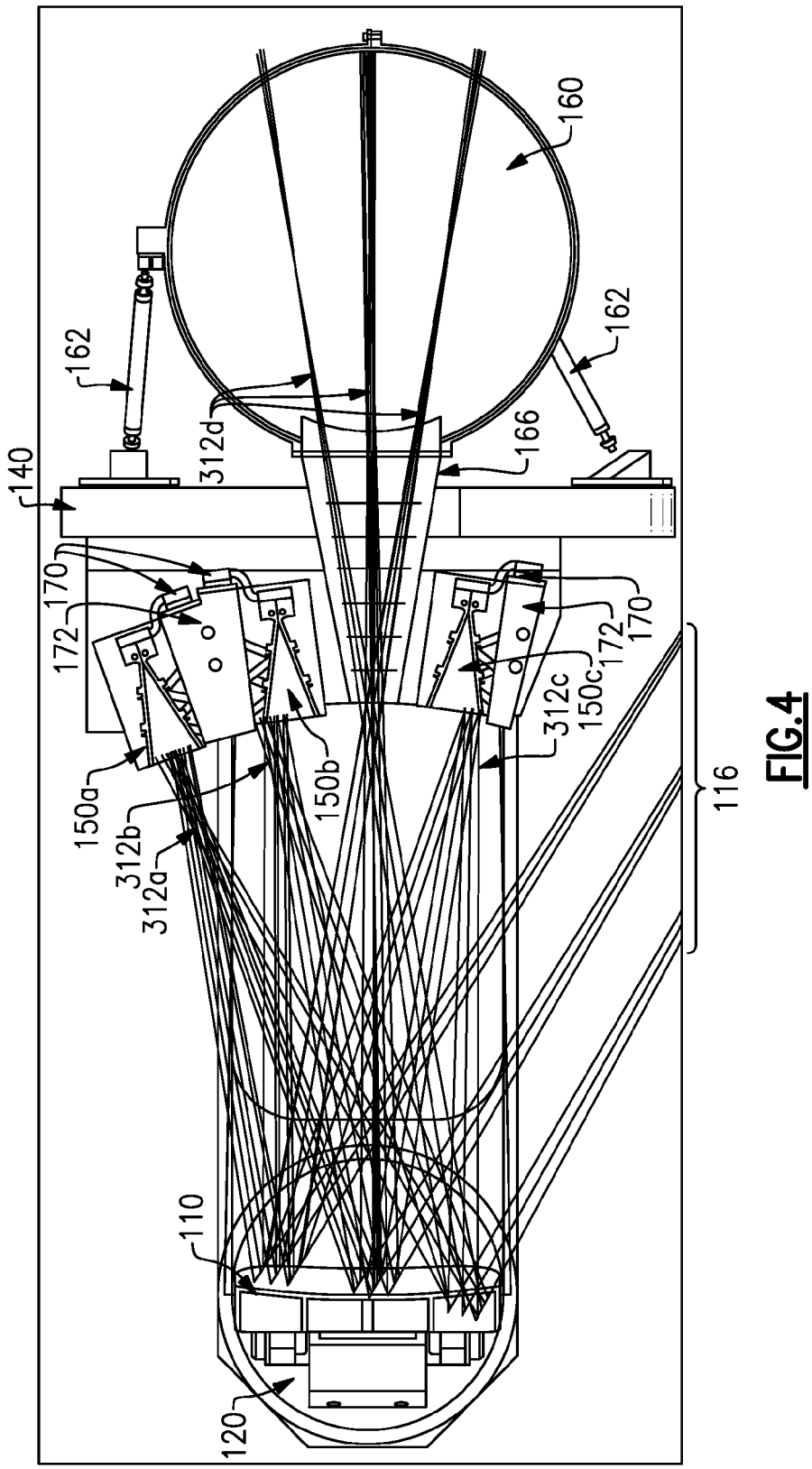
FIG. 4 is a cross-sectional view of an example of the calibration system of FIGS. 2 and 3.

FIG. 1 illustrates a block diagram of a portion of an optical imaging system including one example of a calibration system 100 that can be used to calibrate an optical imaging sensor or detector 250. FIGS. 2-4 illustrate a mechanical implementation of one embodiment of the calibration system 100, as discussed further below. Referring to FIG. 1, the calibration system 100 includes a calibrator 200 and a radiation source module 300. The radiation source module 300 includes a plurality of radiation sources 310 (310a through 310n), each configured to produce a corresponding radiation beam 312 (i.e., 312a through 312n). The plurality of radiation sources 310 can operate in the infrared, visible, or other spectral regions to provide calibration at wavelengths suitable for the optical imaging sensor 250. The calibrator 200 includes a single calibration mirror 110 and a two-axis mirror positioning mechanism 120. As discussed further below with reference to FIG. 2, the two-axis mirror positioning mechanism 120 is configured to rotate the calibration mirror 110 about a first axis (not shown in FIG. 1) in order to move the calibration mirror into a calibration optical path (thereby turning "ON" a calibration mode of the system) and out of the calibration optical path (thereby turning "OFF" the calibration mode and allowing the optical imaging system to perform its normal imaging functions). Thus, rotation of the calibration mirror 110 about the first axis performs the "switch" function discussed above. The two-axis mirror positioning mechanism 120 is further configured to rotate the calibration mirror 110 about a second axis (indicated by arrow 114) when the calibration mirror is in the calibration optical path. This rotation performs the "select" function discussed above, by positioning the calibration mirror 110 such that a radiation beam 312 from one of the radiation sources 310 is focused at the calibration mirror, and is reflected by the calibration mirror to provide a calibration beam 116 that is directed to the sensor 250. In this manner, rotation of the single calibration mirror 110 about two distinct axes performs both the switch and select functions that typically require two mirrors in conventional systems, without requiring movement of the radiation source module 300. In one example the first and second axes are orthogonal to one another.

In one embodiment, the optical sensor 250 includes an infrared detector responsive to infrared radiation. The infrared detector may be configured to be responsive to mid-wave infrared radiation (MWIR), short-wave infrared radiation (SWIR), long-wave infrared radiation (LWIR), or a combination thereof. Accordingly, the plurality of radiation sources 310 may include at least one black body calibration source for calibration in the infrared spectral range. In another embodiment, the optical sensor 250 may be configured to be responsive to the electromagnetic radiation in one or more spectral bands other than or in addition to the infrared. For example, optical sensor 250 may include a detector configured to be responsive to visible light or a hyperspectral detector. Accordingly, the plurality of radiation sources 310 may include at least one visible-band source. Although various examples discussed below include multiple infrared radiation sources (black bodies) and a visible-band radiation source (e.g., an integrating sphere with associated light source), embodiments of the calibration system disclosed herein can include a wide variety of radiation sources, depending on the calibration needs of the optical sensor 250, and are not limited to the specific examples discussed herein.

FIG. 2 illustrates a schematic diagram of one example of the calibration system 100 according to certain embodiments. FIGS. 3 and 4 illustrate a side view and a cross-sectional view, respectively, of an example of the calibration system 100 shown in FIG. 1. FIGS. 3 and 4 further show ray traces of the radiation beams 312a-d from each of the plurality of radiation sources, and the calibration beam 116 that is directed from the calibration mirror 110 towards the optical sensor 250 to be calibrated.

Referring to FIG. 2, in this example the calibration system 100 includes the single calibration mirror 110 that is shown both in a stowed position (A) and a deployed position (B), and the two-axis mirror positioning mechanism 120 that is coupled to the calibration mirror 110. The mirror positioning mechanism 120 is mounted to a housing 130 that is shaped to accommodate the calibration mirror 110 when in the stowed position (A), as shown. In the illustrated example, the calibration mirror 110 is shown mounted to a movable arm 122 of the mirror positioning mechanism 120, which is configured to rotate about a first axis and thereby move the calibration mirror 110 between the stowed position (A) and the deployed position (B), as indicated by arrow 112. In the illustrated example the first axis of rotation of the calibration mirror 110 is collinear with a pivot 124 of the mirror positioning mechanism 120, the arm 122 being configured to rotate about the pivot 124. As discussed above, rotation about this first axis achieves the switch function, turning the calibration mode ON and OFF. The mirror positioning mechanism 120 is further configured to rotate the calibration mirror 110 about a second axis, as indicated by arrow 114, when the calibration mirror is in the deployed position (B), thereby performing the select function, as discussed above.

Referring to FIGS. 1 and 2, in one embodiment, the two-axis mirror positioning mechanism 120 includes a motor 126 and a resolver assembly 128, as shown in FIG. 1. The movable arm 122 can be operatively connected to the motor 126 and the resolver assembly 128. The motor 126 is configured to rotate the movable arm 122 about the pivot 124, which in turn translates to the movement of the calibration mirror 110 with respect to the housing 130, in particular movement of the calibration mirror 110 from the stowed position (A) into the deployed position (B), and back. The movable arm 122 further includes an internal rotation mechanism (not shown) coupled to the calibration mirror 110 to allow rotation of the calibration mirror about the second axis, as indicated by arrow 114. In one embodiment, the motor may be a stepper motor configured to supply a drive force and to facilitate variable positioning of the calibration mirror 110. In one embodiment, the motor 126 is operational under the direction of a control system 210 to rotate the calibration mirror 110 to perform a calibration sequence, as discussed further below. The resolver assembly 128 may be configured to sense the position of the motor 126 or the movable arm 122, e.g., rotational position of either or both of these components, and to determine therefrom the position of the calibration mirror 110. The resolver assembly 128 may send the positional information of the calibration mirror 110 to the control system 210, which in response controls the operation of the motor 126 to ensure desired positioning of the calibration mirror 110. The control system 210 may be separate from and coupled to the two-axis mirror positioning system 120 or may be part of the two-axis mirror positioning system 120. In certain examples the resolver assembly may be replaced or supplemented with another type of angular position sensing mechanism, as will be appreciated by those skilled in the art, given the benefit of this disclosure.

The calibration system 100 further includes a mounting platform 140 that is configured to accommodate the plurality of radiation sources 310. The mounting platform 140 may be part of or coupled to the housing 130. The radiation sources 310 may include two or more different types of radiation sources, such as a visible light radiation source, an infrared radiation source, or any suitable type of radiation source. In the example illustrated in FIGS. 2-4, the plurality of radiation sources includes three black body calibration sources 150a-c mounted to the mounting platform 140 and positioned opposite the mirror positioning mechanism 120. However, in other examples the calibration system 100 may include more or fewer black body calibration sources 150. Additionally, in other examples, any one or more of the black body calibration sources may be replaced with another type of calibration source, which may be used for calibration in any spectral band of interest, not limited to infrared. In the illustrated example, the calibration system 100 further includes an integrating sphere 160 mounted to the mounting platform 140 via a plurality of mounting struts 162. A light source 164 is coupled to the integrating sphere 160. The output of the integrating sphere 160 is aligned with an output slot 166 that allows a calibration light beam from the integrating sphere 160 to be directed to the calibration mirror 110. In certain examples the light source 164 is a visible light source, producing in light in at least a portion of the visible spectral band. The light source 164 may include one or more light-emitting diodes (LEDs), laser diodes, or a combination thereof.

Thus, in certain embodiments, the calibration system 100 includes three black body calibration sources 150a-c and a visible-band calibration source (including a combination of the integrating sphere 160 and the light source 164). Accordingly, such embodiments of the calibration system 100 may provide at least four different calibration measurements, including at least one in the visible spectral band and at least three at different wavelengths in regions/bands of the infrared spectral range. However, numerous other configurations of the calibration system 100 may be implemented to provide a plurality of calibration measurements at any one or more wavelength(s) of interest.

The calibration system 100 provides one integral assembly that allows complete calibrator assembly testing. The housing 130 and mounting platform 140 can be configured to provide precise alignment between the plurality of radiation sources 310 and the calibration mirror 110 in the deployed position (B). The housing 130 may further allow the calibration system 100 to be attached to the other systems using mechanical interfaces (not shown). The housing 130 and the mounting platform 140 can be a single machined part, or can include multiple parts that are connected together. The housing 130 or mounting platform 140 can be customized components that may be different for each design implementation and may depend on the dimensions of the mirror positioning mechanism 120, the optical prescription of the calibration mirror 110, and the number and size of the radiation sources 310. The housing 130 may provide a protective environment for the calibration mirror 110 when the calibration mirror is in the stowed position (A). In one example the housing 130 includes a recess shaped and sized to accommodate the calibration mirror 110 in the stowed position (A). The housing 130 and the mounting platform 140 shown in FIGS. 2-4 are examples of the configuration of the these components, and those skilled in the art will appreciate that the housing 130 and mounting platform 140 may have other configurations, for example to accommodate different designs of the calibration system 100 or optical system in which the calibrator 200 is used.

The configuration of the calibration system 100, including the configuration of the housing 130 and the mounting platform 140, further provides an accessible cooling interface 170 to allow for thermal management of the black body calibration sources 150a-c. According to certain embodiments, the calibration system 100 includes a thermal management sub-system. Referring to FIG. 4, the thermal management sub-system may include cooling units 172 that are attached to the cooling interface 170 and which can be mounted to or positioned proximate to the black body calibration sources 150a-c. The cooling units 172 can provide a relatively cold thermal interface to the black body calibration sources 150a-c in order to dissipate any heat generated by the black body calibration sources 150a-c. In one example, cooling fluid can be supplied to the cooling units 172 via the cooling interface 170 to maintain the cold thermal interface and to maintain each of the black body calibration sources 150a-c at a well-defined set temperature, such that the corresponding radiation beams 312a-d have well-known spectral properties that can be used for accurate calibration of the optical sensor 250.

As shown in FIG. 4, for example, the three black body calibration sources 150a-c can be disposed spaced apart from one another on the mounting platform 140 to facilitate individual thermal management of each source. According to some embodiments, each black body calibration source 150a-c may be maintained at a different temperature. For example, the three black body calibration sources 150a-c may include a "hot" black body source (e.g., 150a) maintained within a temperature range of 350K-400K, an "ambient" black body source (e.g., 150b) maintained within a temperature range of 290K-310K, and a "cold" black body source (e.g., 150c) maintained within a temperature range of 260K-275K. In one example, an ambient black body source (e.g., 150b) is maintained at a temperature range that is between the temperature range of the "hot" blackbody source 150a and the "cold" black body source 150c. Those skilled in the art will appreciate that these temperature ranges are non-limiting examples only, and the three black body calibration sources 150a-c can be maintained at any suitable operating temperatures.

The mounting platform 140 to which the black body calibration sources 150a-c are mounted is stationary with respect to the housing 130. In particular, selection of any of the black body calibration sources 150a-c (or the integrating sphere 160) is achieved by rotating the calibration mirror 110, and does not require any rotation or other movement of the radiation sources 310 or the mounting platform 140. This arrangement simplifies thermal management of the radiation sources.

Thus, aspects and embodiments provide a calibration system 100 that may include a plurality of different radiation sources to allow for calibration over multiple wavelengths or spectral bands in a single integrated assembly. As discussed above, only one, non-imaging calibration mirror 110 is added in calibration path, thereby minimizing error as well as cost, weight, and size associated with the calibration components. The dual-axis mirror positioning mechanism 120 deploys and rotates the calibration mirror 110 to any of a plurality of calibration positions to thereby select any one of the calibration sources 150a-c or 160. Thus, the calibration system 100 uses the two-axis mirror positioning mechanism 120 to accomplish both the switch (into and out of calibration mode) and source-select functions using only the single calibration mirror 110.

In the example illustrated in FIGS. 2-4, the plurality of radiation sources includes three black body calibration sources 150a, 150b, 150c, and a visible-band calibration source including the integrating sphere 160 and associated light source 164. Therefore, in this example, the plurality of calibration positions of the calibration mirror 110 may include at least four positions, and each calibration position in the calibration sequence corresponds to the calibration mirror 110 being pointed in the direction of one of the radiation sources. The mirror positioning mechanism 120 may be configured to rotate the calibration mirror 110 into different ones of the four calibration positions in a calibration sequence, described in more detail below. An optical path is formed between a corresponding one of the radiation sources 310, the calibration mirror 110, and the optical sensor 250 in each calibration position during the calibration sequence. In particular, in each calibration position, the calibration mirror 110 is rotated such that the radiation beam from at least one of the radiation sources is focused at the calibration mirror 110, and is reflected by the calibration mirror 110 to provide the calibration beam 116. For example, in FIG. 4, the calibration mirror 110 is shown rotated to the position at which the radiation beam 312d the integrating sphere 160 approximately focused on the calibration mirror 110. FIG. 4 shows a ray trace of the radiation beams 312a-d from all four radiation sources overlaid. Accordingly, for the calibration mirror 110 in the shown position, the ray trace shows the radiation beam 312a from the black body calibration source 150a focused at a point "in front of" (i.e., on the source module side of) the calibration mirror 110 and the radiation beam 312c from the black body calibration source 150c focused at a point "behind" (i.e., on the mirror positioning mechanism side of) the calibration mirror 110. The calibration mirror 110 can be rotated about the second axis 118 to be repositioned such that the radiation beam 312a or 312b is focused on the calibration mirror 110, thereby "selecting" the corresponding radiation source 150a or 150b, respectively.

Figure 5:
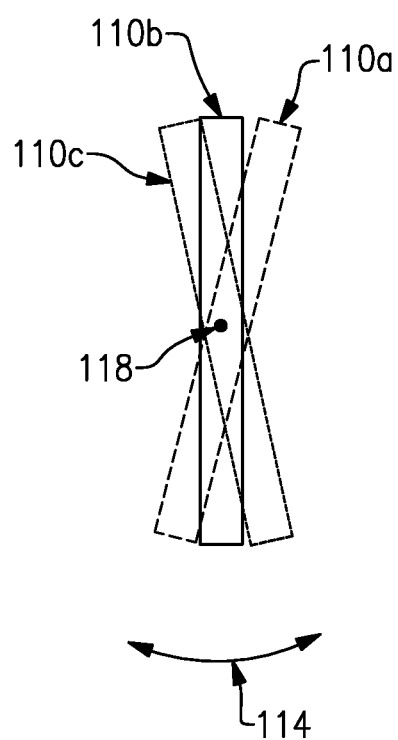
FIG. 5 is a diagram showing an example of rotation of the calibration mirror according to aspects of the present invention.

Referring to FIGS. 4 and 5, the mirror positioning mechanism 120 is configured to rotate the calibration mirror 110 about the second axis 118, thereby tilting the calibration mirror 110 either "forward" so as to be in a position 110a or "backwards" so as to be in a position 110c, relative to a position 110b. In the illustrate examples, position 110b corresponds to the position of the calibration mirror 110 shown in FIG. 4 in which the radiation beam 312b from the black body calibration source 150b is focused onto the mirror surface such that the black body calibration source 150a is "selected." By rotating the calibration mirror 110 about the second axis 118, the calibration mirror can be repositioned such that another one or more of the radiation beams (e.g., 312a or 312c) is focused onto the mirror surface and reflected to form the calibration beam 116.

Although in some embodiments only one radiation source 310 may be selected and operated at a given time, in other embodiments two or more radiation sources can be operated together. In certain examples the radiation sources 310 can be arranged such that more than one radiation beam 312 can be focused onto the calibration mirror 110 at a given position of the mirror. For example, as shown in FIG. 4, the radiation beam 312d from the integrating sphere 160 and the radiation beam 312b from the black body calibration source 150b are both approximately focused on the calibration mirror 110 for the mirror position shown. In this case, the calibration system 100 may provide simultaneous calibration at infrared wavelength(s) emitted by the black body calibration source 150b and at visible wavelength(s) emitted from the integrating sphere 160. In certain examples, this arrangement can be used to calibrate multiple detectors in the sensor 250 simultaneously, for example, by using a beamsplitter to separate the infrared and visible components of the calibration beam 116 and direct each to an appropriate detector.

In certain examples, at least some calibration positions of calibration mirror 110 may not be at an ideal focus position for the corresponding radiation source. For example, referring to FIGS. 3 and 4, the radiation beams 312a and 312c from the black body calibration sources 150a and 150c, respectively, are off-axis on the calibration mirror 110, meaning that the beams are not symmetrically centered about a central optical axis of the calibration mirror 110. Rather, as shown in FIGS. 3 and 4, the radiation beam 312a is directed toward an upper portion of the calibration mirror 110, whereas the radiation beam 312c is directed toward a lower portion of the calibration mirror 110. Optical performance may be degraded the farther off-axis any radiation source and its corresponding radiation beam is with respect to the calibration mirror 110. Accordingly, optical performance specifications and physical constraints of the calibration system 100 may limit the number of radiation sources 310 that can be included.

The calibration mirror 110 may be a positively powered mirror configured to reflect and focus the radiation beam from the selected one of the radiation sources 310 to the optical sensor 250. In one embodiment, the calibration mirror 110 may be configured to receive the radiation beams 312 from all the radiation sources 310 in a way that minimizes potential optical aberrations and provides uniform energy onto the optical sensor 250. In some embodiments, the calibration mirror 110 includes an optical prescription that is optimized for one of the radiation sources 310, while also being configured to receive the radiation beams 312 from the remaining radiation sources and provide uniform energy onto the optical sensor 250. For example, the calibration mirror 110 may be optimized for the black body calibration source 150b, while still able to receive and direct the radiation beams from the black body calibration sources 150a and 150c, and from the integrating sphere 160.

Figure 6:
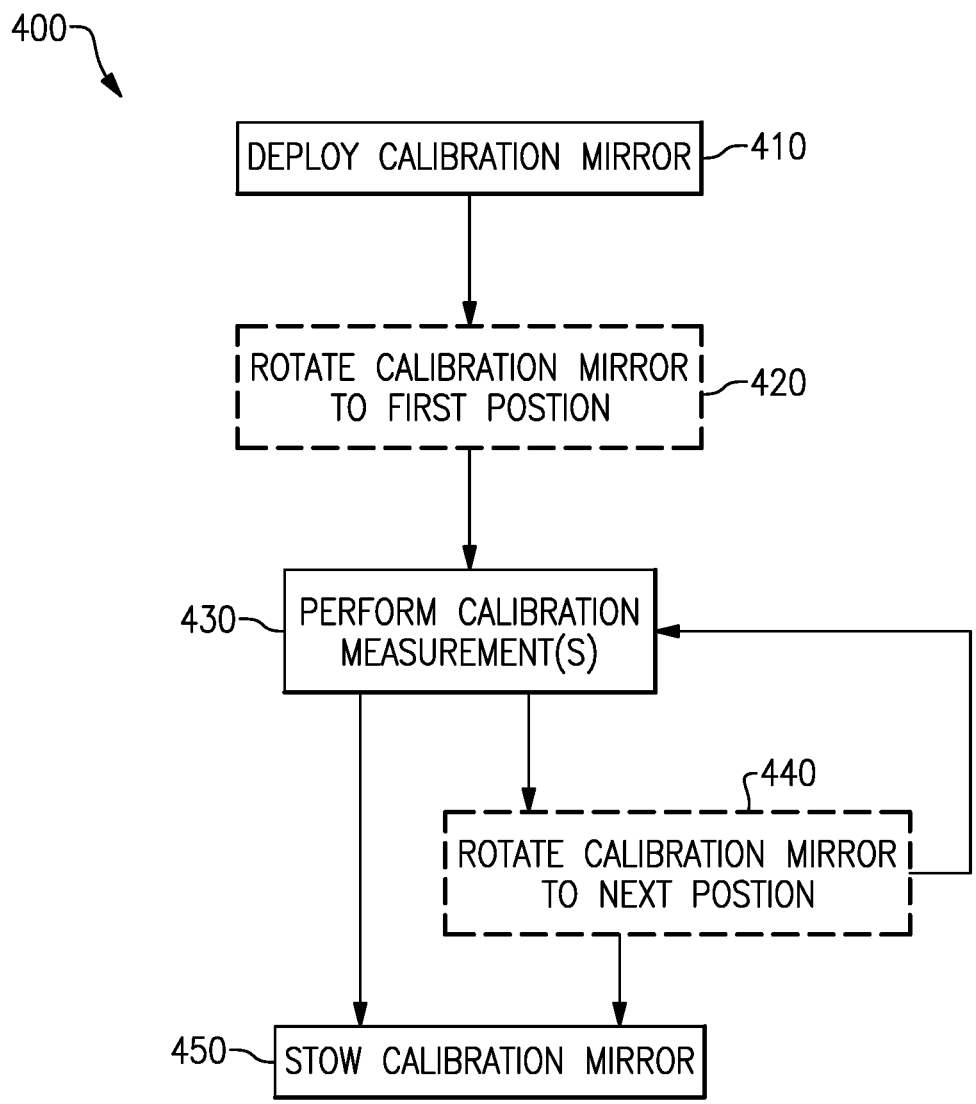
FIG. 6 is a flow diagram illustrating one example of a calibration sequence using a calibrator according to aspects of the present invention.

Referring to FIG. 6 there is illustrated a flow diagram of one example of a calibration sequence 400 that can be performed using embodiments of the calibration system 100. During normal operations of the associated optical system and sensor 250, the calibration mode is OFF and the calibration mirror 110 is in the stowed position (A). When the calibration mode is turned ON, the calibration sequence begins by deploying the calibration mirror 110 from the stowed position (A) to the deployed position (B), as shown in FIG. 2 (step 410). As discussed above, this is achieved by rotating the calibration mirror 110 about the first axis (indicated by arrow 112 in FIG. 2) under control of the mirror positioning mechanism 120. Once the calibration mirror 110 is in the deployed position (B), the mirror positioning mechanism 120 is configured to rotate the calibration mirror about the second axis 118 (indicated by arrow 114 in FIG. 2) into one of a plurality of calibration positions.

In one example, the calibration sequence 400 includes a step 420 of rotating the calibration mirror 110 about the second axis 118 into a first calibration position in which the calibration mirror 110 is positioned to receive a radiation beam 312 from at least one of the radiation sources (e.g., 150a, 150b, 150c, or 160) and to provide the calibration beam 116 to the sensor 250. One or more calibration measurements may be performed (step 430) while the calibration mirror 110 is in the first calibration position (step 430). In certain examples, the calibration mirror 110 and the radiation source module 300 can be configured and arranged relative to one another such that when the calibration mirror 110 is rotated about the first axis from the stowed position (A) into the deployed position (B), the immediate deployed position corresponds to the first calibration position, in which the calibration mirror 110 is positioned to receive at least one of the radiation beams 312. Thus, a calibration measurement can be performed without first requiring any rotation of the calibration mirror 110 about the second axis 118. Accordingly, in such an arrangement, step 420 can be omitted. In other examples, it may be desired to perform a first calibration measurement that does not use the particular wavelength(s) emitted by the radiation source(s) that is/are selected by the calibration mirror 110 being in the immediate deployed position. In this case, step 420 can be included to rotate the calibration mirror 110 to select another one or more radiation sources.

In certain examples, the calibration sequence 400 may include only calibration measurement(s) taken with the calibration mirror 110 in the first calibration position (i.e., using only the one or more first selected radiation sources). Accordingly, when these measurement(s) are complete, the calibration mirror 110 can be returned to the stowed position (A) in step 450. In other examples, the calibration sequence 400 can include performing additional calibration measurements (i.e., repeating step 430) with using others of the plurality of radiation sources. Accordingly, the calibration sequence 400 may include a step 440 of rotating the calibration mirror 110 about the second axis 118 from the first calibration position into a second calibration position to receive the radiation beam(s) from another one or more of the radiation source. Steps 430 and 440 may be repeated multiple times to perform one or more calibration measurements using any or all of the radiation sources 310. For example, the calibration sequence can include rotating the calibration mirror 110 into the first calibration position to perform a first calibration measurement or set of measurements using the first black-body calibration source 150a, then rotating the calibration mirror 110 into the second calibration position to perform a second calibration measurement or set of measurements using the second black-body calibration source 150b. The calibration sequence may further include rotating the calibration mirror 110 into a third calibration position to perform a third calibration measurement or set of measurements using the third black-body calibration source 150c, then rotating the calibration mirror 110 into a fourth calibration position to perform a fourth calibration measurement or set of measurements using the radiation beam 312d from the integrating sphere 160. Upon completion of all calibration measurements in a sequence, the calibration mirror 110 can be returned to the stowed position (step 450).

It is appreciated that the calibration sequence 400 may be adapted to perform one or more calibration measurements using any one or more of the radiation sources in any order, not limited to the above-mentioned example. Additionally, the calibration sequence 400 is not limited to calibrating only once at any one position during the overall calibration sequence. For example, the calibration sequence 400 may include performing one or more measurements with the calibration mirror 110 in the first calibration position, followed by one or more measurements in the third calibration position, followed by one or more measurements in the second calibration position, then followed by one or more measurements at the first calibration position again, and then followed by one or more measurements in the third calibration position, before returning the calibration mirror 110 to the stowed position (A). The calibration sequence 400 may thus include any number of measurements taken using any combination of calibration positions as desired. Further, as discussed above, although the example system illustrated in FIGS. 2-4 includes four radiation sources, other embodiments of the calibration system 100 may include more or fewer radiation sources, and the calibration mirror 110 may therefore be rotated into more or fewer calibration positions during any calibration sequence 400. Additionally, not every radiation source may be used in each calibration sequence.

Thus, aspects and embodiments provide a multi-wavelength or multi-band calibration system that uses a dual-axis mirror positioning mechanism and only a single calibration mirror, instead of two mirrors as used conventionally, and which does not require any rotation or other movement of the radiation sources to achieve calibration of the sensor. As discussed above, the calibration system includes a single calibration mirror which is rotated into the optical path of different stationary radiation sources. Embodiments of the calibration system may be scalable to radiation sources of any size, and can include a variety of different types and numbers of radiation sources. In addition, the use of a single calibration mirror may be relatively inexpensive and may provide additional space and packaging benefits.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A calibrator comprising:
   a housing;
   a dual-axis mirror positioning mechanism disposed within the housing; and
   a single calibration mirror coupled to the dual-axis mirror positioning mechanism and disposed within the housing, the dual-axis mirror positioning mechanism being configured to rotate the calibration mirror about a first axis to move the calibration mirror from a stowed position into a deployed position and, when the calibration mirror is in the deployed position, to rotate the calibration mirror about a second axis into a plurality of calibration positions, the first and second axes being orthogonal.

2. The calibrator of claim 1 wherein the dual-axis mirror positioning mechanism includes a movable arm configured to rotate about the first axis, the calibration mirror being mounted to the movable arm.

3. The calibrator of claim 2 wherein the dual-axis mirror positioning mechanism includes a motor and a resolver.

4. A calibration system for calibrating a sensor, the calibration system comprising:
   at least one radiation source configured to emit electromagnetic radiation;
   a dual-axis mirror positioning mechanism disposed opposite the at least one radiation source; and
   a single calibration mirror coupled to the dual-axis mirror positioning mechanism, the dual-axis mirror positioning mechanism being configured to rotate the calibration mirror about a first axis to move the calibration mirror from a stowed position into a deployed position, and, when the calibration mirror is in the deployed position, to rotate the calibration mirror about a second axis to at least one calibration position, the calibration mirror in the at least one calibration position forming an optical path between the sensor and the at least one radiation source and being configured to receive the electromagnetic radiation from the at least one radiation source and to reflect the electromagnetic radiation toward the sensor, wherein in the stowed position, the calibration mirror does not reflect the electromagnetic radiation from the at least one radiation source, and wherein the first and second axes are orthogonal to one another.

5. The calibration system of claim 4 wherein the at least one radiation source is a black body calibration source configured to emit infrared electromagnetic radiation.

6. The calibration system of claim 4 further comprising a housing, the dual-axis mirror positioning mechanism being mounted to the housing and the calibration mirror being contained within the housing.

7. The calibration system of claim 6 further comprising a mounting platform, the at least one radiation source being fixedly mounted to the mounting platform.

8. The calibration system of claim 7 wherein the mounting platform is integral with the housing.

9. The calibration system of claim 7 wherein the mounting platform is fixedly connected to the housing.

10. The calibration system of claim 7 wherein the at least one radiation source includes a plurality of radiation sources, the plurality of radiation sources including a plurality of black body calibration sources each configured to emit infrared electromagnetic radiation.

11. The calibration system of claim 10 wherein the plurality of radiation sources further includes a visible-band calibration source, the visible-band calibration source including an integrating sphere mounted to the mounting platform and a visible light source coupled to the integrating sphere.

12. The calibration system of claim 11 wherein the visible light source includes at least one light emitting diode.

13. The calibration system of claim 10 wherein, when the calibration mirror is in the deployed position, the dual-axis mirror positioning mechanism is configured to rotate the calibration mirror about the second axis to a plurality of calibration positions, the calibration mirror in each of the plurality of calibration positions forming an optical path between the sensor and at least one radiation source of the plurality of radiation sources and being configured to receive the electromagnetic radiation from the at least one radiation source and to reflect the electromagnetic radiation toward the sensor.

14. The calibration system of claim 10 further comprising a thermal management sub-system coupled to the plurality of black body calibration sources and configured to maintain each black body calibration source within a respective predetermined temperature range.

15. The calibration system of claim 10 wherein the plurality of black body calibration sources includes three black body calibration sources, and the plurality of calibration positions includes four calibration positions.

16. The calibration system of claim 4 wherein the at least one radiation source includes a visible-band calibration source, the visible-band calibration source including an integrating sphere and a visible light source coupled to the integrating sphere.

17. A method of calibrating a sensor, the method comprising:
rotating a calibration mirror about a first axis from a stowed position to a deployed position;
rotating the calibration mirror, when in the deployed position, about a second axis to a first calibration position of a plurality of calibration positions, the second axis being orthogonal to the first axis;
receiving at the calibration mirror a first radiation beam from a first one of a plurality of radiation sources, the first radiation beam being within a first spectral range;
reflecting the first radiation beam from the calibration mirror to the sensor; and
performing a first calibration measurement at the sensor using the first radiation beam.

18. The method of claim 17 further comprising:
after performing the first calibration measurement, rotating the calibration mirror about the second axis into a second calibration position of the plurality of calibration positions;
receiving at the calibration mirror a second radiation beam from a second one of the plurality of radiation sources, the second radiation beam being within a second spectral range different from the first spectral range;
reflecting the second radiation beam from the calibration mirror to the sensor; and
performing a second calibration measurement at the sensor using the second radiation beam.

19. The method of claim 18 wherein the first and second spectral ranges are non-overlapping.

20. The method of claim 18 further comprising:
after performing the second calibration measurement, rotating the calibration mirror about the first axis to return the calibration mirror to the stowed position.

* * * * *